United States Patent
Lee et al.

(10) Patent No.: US 11,907,255 B2
(45) Date of Patent: Feb. 20, 2024

(54) ACCESS-FREQUENCY-BASED ENTITY REPLICATION TECHNIQUES FOR DISTRIBUTED PROPERTY GRAPHS WITH SCHEMA

(71) Applicant: Oracle International Corporation, Redwood Shores, CA (US)

(72) Inventors: Jinsu Lee, San Mateo, CA (US); Petr Koupy, Zurich (CH); Vasileios Trigonakis, Zurich (CH); Sungpack Hong, Zurich (CH); Hassan Chafi, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 35 days.

(21) Appl. No.: 17/686,938

(22) Filed: Mar. 4, 2022

(65) Prior Publication Data
US 2023/0281219 A1 Sep. 7, 2023

(51) Int. Cl.
*G06F 17/00* (2019.01)
*G06F 16/27* (2019.01)
(Continued)

(52) U.S. Cl.
CPC .......... *G06F 16/27* (2019.01); *G06F 16/2282* (2019.01); *G06F 16/284* (2019.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS 9,262,323 B1 * 2/2016 Shankaran .......... G06F 12/0868
9,727,550 B2 * 8/2017 He ...................... G06F 3/04842
(Continued)

FOREIGN PATENT DOCUMENTS

CN 112765177 A 5/2021

OTHER PUBLICATIONS

Roth et al., "PGX.D/Async: A Scalable Distributed Graph Pattern Matching Engine", In Proceedings of the Fifth International Workshop on Graph Data-Management Experiences & Systems, dated 2017, 6 pages.
(Continued)

*Primary Examiner* — Hung D Le
(74) *Attorney, Agent, or Firm* — Hickman Becker Bingham Ledesma LLP; Brian N. Miller (57) ABSTRACT

In an embodiment, multiple computers cooperate to retrieve content from tables in a relational database. Each table contains respective rows. Each row contains a vertex of a graph. Many high-degree vertices are identified. Each high-degree vertex is connected to respective edges in the graph. A count of the edges of each high-degree vertex exceeds a degree threshold. A central computer detects that all vertices in a high-degree subset of tables are high-degree vertices. Based on detecting the high-degree subset of tables, multiple vertices of the graph that are not in the high-degree subset of tables are replicated. Within local storage capacity limits of the computers, this degree-based replication may be supplemented with other vertex replication strategies that are schema based, content based, or workload based. This intelligent selective replication maximizes system throughput by minimizing graph data access latency based on data locality.

20 Claims, 6 Drawing Sheets

(51) Int. Cl.
*G06F 16/22* (2019.01)
*G06F 16/28* (2019.01)

(56) References Cited

U.S. PATENT DOCUMENTS

| | | | |
|---|---|---|---|
| 10,067,947 B2* | 9/2018 | Bares | G06F 16/1748 |
| 10,268,776 B1* | 4/2019 | Johnson | G06F 16/9014 |
| 10,990,595 B2 | 4/2021 | Roth et al. | |
| 2006/0107823 A1* | 5/2006 | Platt | G06F 16/634 84/616 |
| 2011/0161294 A1* | 6/2011 | Vengerov | G06F 16/275 707/E17.046 |
| 2013/0332387 A1* | 12/2013 | Mirra | G06Q 40/06 705/36 R |
| 2015/0189039 A1* | 7/2015 | Cheng | G06F 12/0831 709/216 |
| 2015/0256450 A1* | 9/2015 | Yang | H04L 41/0886 370/256 |
| 2015/0370838 A1 | 12/2015 | Paradies et al. | |
| 2016/0147819 A1* | 5/2016 | Schreter | G06F 16/214 707/701 |
| 2016/0335180 A1* | 11/2016 | Teodorescu | G06F 16/162 |
| 2017/0293697 A1* | 10/2017 | Youshi | G06F 16/84 |
| 2017/0364534 A1 | 12/2017 | Zhang et al. | |
| 2018/0173755 A1* | 6/2018 | Xia | G06F 16/24578 |
| 2018/0173763 A1* | 6/2018 | Xia | G06F 16/2282 |
| 2018/0203897 A1 | 7/2018 | Van Rest | |
| 2018/0277590 A1* | 9/2018 | Chung | H01L 33/60 |
| 2019/0121810 A1 | 4/2019 | Zhuang et al. | |
| 2019/0354526 A1* | 11/2019 | Roth | G06F 16/2471 |
| 2021/0150135 A1* | 5/2021 | Lereya | G06Q 10/06316 |
| 2021/0297324 A1* | 9/2021 | Singh | H04L 41/147 |

OTHER PUBLICATIONS

Cheng et al., "Which Category Is Better: Benchmarking Relational and Graph Database Management Systems", Data Science and Engineering, https://doi.org/10.1007/s41019-019-00110-3, dated Nov. 11, 2019, 14 pages.

Datastax, "A Solution to the Supernode Problem", https://www.datastax.com/dev/blog/asolutiontothesupernodeproblem, dated Oct. 25, 2012, 6 pages.

Deutsch et al., "Aggregation Support for Modern Graph Analytics in TigerGraph", SIGMOD '20: Proceedings of the 2020 ACM SIGMOD International Conference on Management of Data, dated Jun. 14, 2020, 16 pages.

Deutsch et al., "TigerGraph: A Native MPP Graph Database", White Paper, dated Jan. 2019, 28 pages.

Ho et al., "Data Replication for Distributed Graph Processing," 2013 IEEE Sixth International Conference on Cloud Computing, dated 2013, 8 pages.

Huang et al., "LEOPARD: Lightweight Edge-Oriented Partitioning and Replication for Dynamic Graphs", Proceedings of the VLDB Endowment, vol. 9, Issue 7, Mar. 2016, 12 pages.

Angles et al., "The Linked Data Benchmark Council: A Graph and RDF Industry Benchmarking Effort", ACM SIGMOD Record, vol. 43, Issue 1, dated Mar. 2014, 5 pages.

Neo4j.com, "Sharding Graph Data with Neo4j Fabric", available: https://neo4j.com/developer/neo4j-fabric-sharding/, retrieved Feb. 4, 2022, 15 pages.

Wang et al., "Gunrock: GPU Graph Analytics", ACM Transactions on Parallel Computing (TOPC), vol. 4, No. 1, dated 2017, 49 pages.

Shah et al., "Scalable Network Analytics for Characterization of Outbreak Influence in Voluminous Epidemiology Datasets", https://onlinelibrary.wiley.com/doi/am-pdf/10.1002/cpe.4998, dated 2019, 21 pages.

Smagulova et al., "Vertex-Centric Parallel Computation of SQL Queries", SIGMOD '21, dated Jun. 20, 2021, 14 pages.

Spark.apache.org, "GraphX Programming Guide", available: https://spark.apache.org/docs/latest/graphx-programming-guide.html, retrieved Oct. 29, 2021, 14 pages.

Spark.apache.org, "Spark Overview", available: https://spark.apache.org/docs/latest/index.html, retrieved Oct. 29, 2021, 2 pages.

TigerGraph.com, "Introducing TigerGraph DB the First Native Parallel Graph (NPG)", available: https://www.tigergraph.com/tigergraph-db/, retrieved Oct. 29, 2021, 3 pages.

Tpc.org, "TPC Benchmark H" Standard Specification, Revision 3.0.0, dated Feb. 18, 2021, 138 pages.

Verma et al., "An Experimental Comparison of Partitioning Strategies in Distributed Graph Processing", Proceedings of the VLDB Endowment, vol. 10, Issue 5, Jan. 2017, 13 pages.

Mayer et al., "Hybrid Edge Partitioner: Partitioning Large Power-Law Graphs under Memory Constraints", In Proceedings of the 2021 International Conference on Management of Data (SIGMOD '21), dated Jun. 2021, 14 pages.

Chen et al., "Method for Replica Creation in Data Grids Based on Complex Networks", The Journal of China Universities of Posts and Telecommunications, vol. 17, Issue 4, dated Aug. 2010, pp. 110-115.

* cited by examiner

201 In relational database, store tables that contain rows that contain distinct vertices of graph 202 Identify high-degree vertices that each is connected to more edges in graph than degree threshold 203 Detect that all vertices in particular table are high-degree vertices 204 From schema of relational database, infer that all vertices in low-degree table can be connected by edges only to vertices in particular table 205 Each computer receives request that contains identifier of low-degree table 206 For each vertex in respective subset of vertices, each computer sends identifier of vertex and count of edges that are connected to vertex 207 Replicate some vertices that are not high-degree vertices to all computers

ACCESS-FREQUENCY-BASED ENTITY REPLICATION TECHNIQUES FOR DISTRIBUTED PROPERTY GRAPHS WITH SCHEMA

FIELD OF THE DISCLOSURE

This disclosure relates to distributed loading of a graph from relational tables. Presented herein are techniques that load vertices based on a relational schema, contents of the relational tables, and a workload of various data manipulation language (DML) statements.

BACKGROUND

A graph may be loaded from relational tables in a database. Various ways of mapping and transforming tabular relational data into a graph may entail various overhead and impedance that typically does not impact graph querying and graph analytics that occur after the graph is already loaded from the database. However, loading a graph may involve more data than can be stored by one machine, in which case a cluster of cooperating machines is needed.

In a typical distributed property graph processing engine, graph data is partitioned according to various techniques and heuristics, and each partition is stored on a respective machine. Graph partitioning tries to evenly partition the graphs to have almost a same amount of work on each machine. Because the graph is partitioned (e.g. sharded) and distributed across all machines, it is inevitable to transfer graph data through network media if a machine needs to execute computation on graph data stored in a partition on another machine. Due to network input/output (I/O) roundtrip latency, such data transfer is one of the most expensive operations in a distributed graph engine.

Demand to access various graph elements and graph components such as partitions, subgraphs, traversal paths, vertices, and edges may be imbalanced such that one or some machines contain graph data that is much more frequently accessed than graph data on other machines. This imbalance may cause a network element or a processing element to become a bottleneck that increases latency and decreases system throughput. For example, an imbalance may overload a network switch, a network interface card (NIC) of a machine, or a central processing unit (CPU) of a machine. Thus, horizontal scaling of local storage and processing capacity might provide processing bandwidth that is attenuated, which causes underutilization of some participating machines.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In distributed graph processing systems, data replication is critical for performant execution. A potentially frequently accessed vertex may be detected based on a number of connected vertices (a degree) of the vertex. Prediction by vertex degree is based on an assumption that if a vertex has more connections with other vertices, it will be accessed more frequently. In some cases, degree information is not enough to identify such computationally important vertices. Herein is an advanced new technique that identifies potentially frequently accessed vertices more accurately based on degree information but also database schema information, database contents, and workload statistics.

Replication comes at the expense of local storage. At one extreme, no replication occurs, so that the minimum local storage is consumed. At the other extreme, all data is replicated, and all accesses become local, which is an approach that cannot be used in practice in a distributed system due to limited local storage capacity. Intelligently selected replication of important/frequently-accessed data can increase performance. Herein are techniques for deciding which graph data to replicate. This includes a solution that is orthogonal to how much data to replicate and can be applied on any distributed graph engine.

This approach has a degree threshold for detecting a high-degree vertex. A capacity threshold is used for limiting how many vertices are replicated. If the replication capacity is not exhausted by replicating relational database tables that contain only high-degree vertices, then schematically related tables may also be replicated. Two tables are related if one table contains a foreign key that references the other table.

Vertices to be replicated can be also detected by statistics collected about executions of graph queries. When queries run, statistics may be collected such as a number of table accesses for each table. After detecting high-degree tables and replicating them, once queries are completed, if there is a table that is accessed more than or equal to the high-degree table, the table can be promoted as a replicated table.

These techniques have the following performance benefits:

prevent workload imbalance produced by uneven data distribution,
reduce the cost for data communication,
identify vertices/tables with high probability of cross-partition access, and
predict frequently accessed vertices more accurately with schema information.

Embodiments of this approach may implement or leverage some or all of the following techniques and tools:

entity/node/object/data/vertex replication techniques/tools, access frequency based entity/node/vertex replication mechanisms in distributed graphs, identifying and replicating high-degree vertices, extending and complementing degree-based entity replication techniques, identifying vertices/tables with high probability of cross-partition access, partial replication of important/frequently-accessed data, static entity replication using thresholds, distributed property graphs with schema information, balancing partial and full replication, and distributed property graph analytics engines/tools.

In an embodiment, multiple computers cooperate to retrieve content from tables in a relational database. Each table contains respective rows. Each row contains a vertex of a graph. Many high-degree vertices are identified. Each high-degree vertex is connected to respective edges in the graph. A count of the edges of each high-degree vertex exceeds a degree threshold. A central computer detects that all vertices in a high-degree subset of tables are high-degree vertices. Based on detecting the high-degree subset of tables, multiple vertices of the graph that are not in the high-degree subset of tables are replicated. Within local storage capacity limits of the computers, this degree-based replication may be supplemented with other vertex replication strategies that are schema based, content based, or workload based. This intelligent selective replication maximizes system throughput by minimizing graph data access latency based on data locality.

1.0 Example Distributed System

Figure 1:
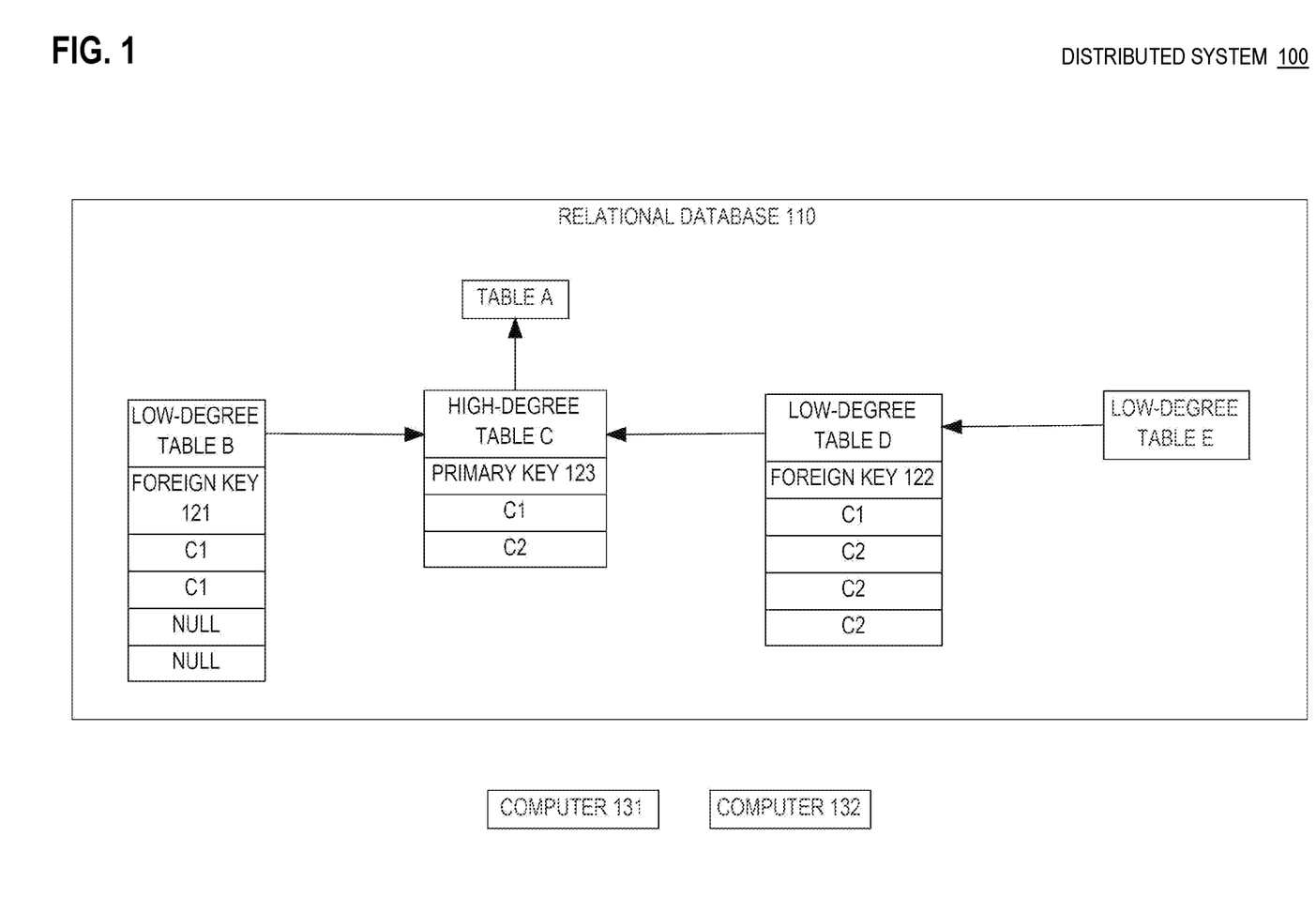
FIG. 1 is a block diagram that depicts an example distributed system that provides distributed loading of a graph stored in relational tables.

FIG. 1 is a block diagram that depicts an example distributed system 100 that provides distributed loading of a graph stored in relational tables A-E. Distributed system 100 implements techniques that load vertices of the graph based on: a relational schema, contents of any of tables A-E, and/or a workload of various data manipulation language (DML) statements. Distributed system 100 contains computers 131-132 that may each be a rack server such as a blade, a mainframe, a personal computer, a virtual machine, or other computing device.

Computers 131-132 are connected by a communication network such as a local area network (LAN) or an internetwork, which also connects relational database 110 and/or a database management system (DBMS) that operates relational database 110. Although computers 131-132 do not contain relational database 110, computers 131-132 may receive content from relational database 110 in various ways in various embodiments. Relational database 110 may or may not be operated by a DBMS that is hosted by other computer(s), and computers 131-132 may cooperate with the DBMS.

1.1 Relational Tables

Relational database 110 may or may not be stored in a remote filesystem that computers 131-132 may cross mount. Each of tables A-E may contain rows and columns of data that may be persisted in row-major or columnar (i.e. column-major) format. In an embodiment, each of tables A-E is stored in respective remote file(s) in a Hadoop filesystem (HDFS). For example, table A may be horizontally partitioned by rows and/or vertically partitioned by columns into multiple Apache Parquet files or object row columnar (ORC) files.

Each of tables A-E stores a distinct kind of vertices of the graph. Each row in each table stores a distinct vertex. A table may have a column that is a primary key that contains a distinct value for each row/vertex. For example as shown, high-degree table C contains two vertices that respectively have distinct values C1-C2 in primary key 123 that is a column of high-degree table C.

Tables A-E may contain more columns than shown. For example, the graph may be a property graph, and any of tables A-E may contain a payload column that contains colors of vertices in that table. Tables A-E may contain more rows than shown. For example, table A may contain billions of rows.

1.2 Edges

Each edge in the graph connects exactly two respective vertices. Edges may be directed or undirected, and techniques herein treat edges as undirected. There may or may not be different kinds of edges. Edges may or may not have properties such as a label, a weight, or a timestamp.

An edge may be stored as a value of a foreign key in a table that corresponds to a primary key in another table. For example, foreign keys 121-122 each corresponds to primary key 123. The directed arrow that originates at low-degree table B and terminates at high-degree table C indicates that each vertex in low-degree table B may be connected to a respective edge that is connected to a respective vertex in high-degree table C. Definitions of table degree, vertex degree, and an integer threshold between high and low vertex degree are presented later herein.

A correspondence between two key columns may be mandatory or optional. For example, the NULL values shown in foreign key 121 indicates that the correspondence between keys 121 and 123 is optional, and that two vertices in low-degree table B are not connected to any vertex in high-degree table C. The two C1 values in foreign key 121 indicate that low-degree table B contains two vertices that are connected to a same vertex in high-degree table C that has value C1 in primary key 123. Regardless of whether the correspondence between keys 121 and 123 is mandatory or optional, the absence of value C2 in foreign key 121 indicates that high-degree table C contains a vertex that is not connected to any vertex in low-degree table B.

1.3 Vertex Distribution and Replication

Each of computers 131-132 may load a respective subset of vertices/rows of any of tables A-E. Each vertex is loaded into volatile or nonvolatile storage of at least one of computers 131-132. In an embodiment, the vertices/rows of any of tables A-E may be divided into disjoint (i.e. non-intersecting) subsets that contain equal amounts of vertices/rows, and there may be as many subsets as available computers 131-132 so that there may be a one-to-one correspondence between each subset and each computer. For example if there are two computers 131-132, then each computer may receive and store half of the vertices/rows of each of tables A-E.

Each of computers 131-132 lacks capacity to locally store all of the vertices of the graph. Each of computers 131-132 has extra capacity that is more than needed to locally store an equally-sized subset of vertices/rows of each of tables A-E. Some vertices of the graph may be locally stored on more than one of computers 131-132.

Loading of vertices into computers 131-132 may occur as follows. In a first phase, each of computers 131-132 may receive and locally store an equally-sized disjoint subset of vertices of each of tables A-E. In a second phase, all of computers 131-132 may receive and locally store copies of an intelligently selected subset of vertices in the graph, even though each of those selected vertices is already locally stored on a respective one of the computers.

2.0 Vertex Replication Process

Figure 2:
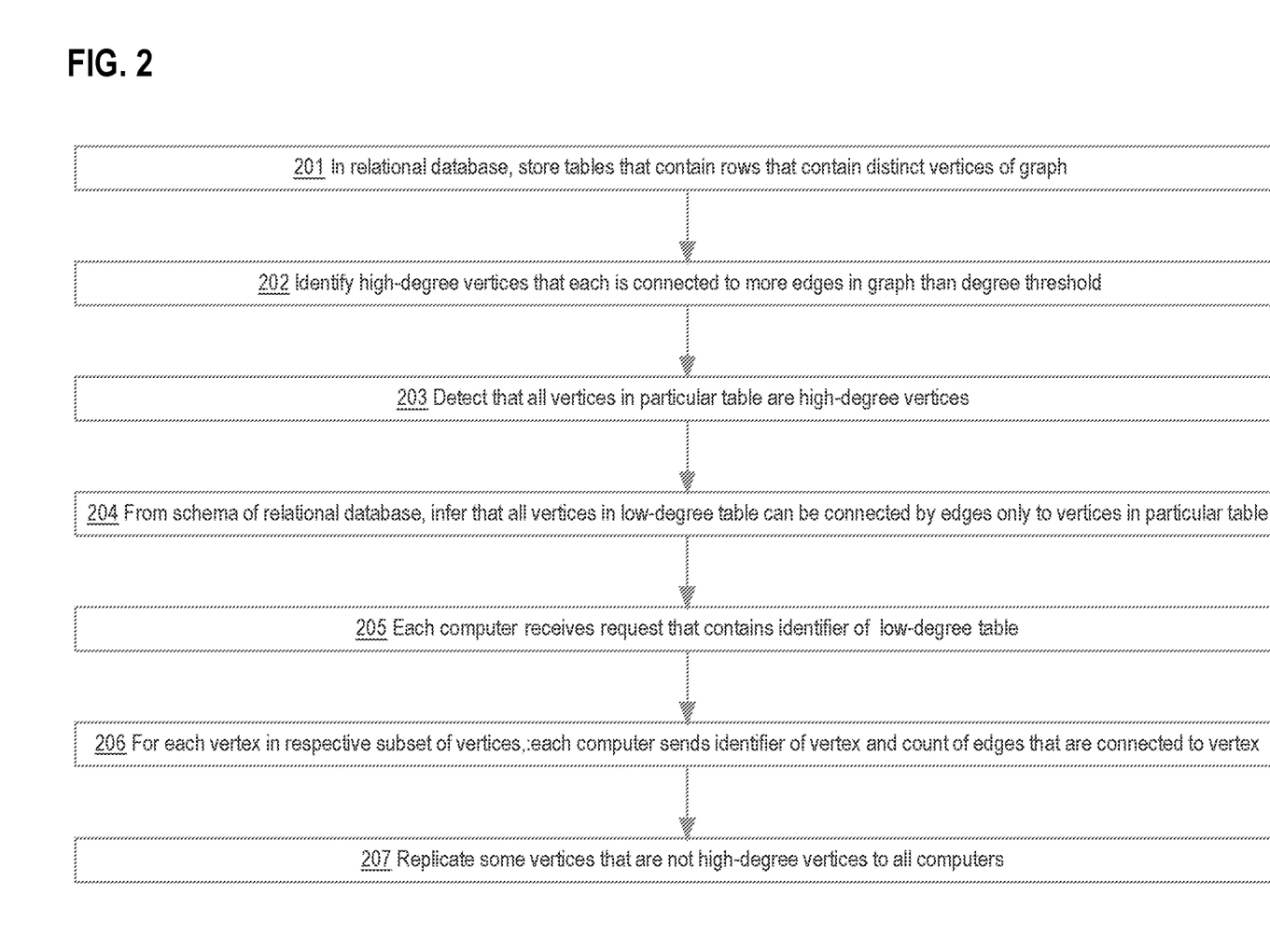
FIG. 2 is a flow diagram that depicts an example computer process that a distributed system may perform for distributed loading of a graph stored in relational tables.

FIG. 2 is a flow diagram that depicts an example computer process that distributed system 100 may perform for distributed loading of a graph stored in relational tables A-E, in an embodiment. FIG. 2 is discussed with reference to FIG. 1.

In relational database 110, preparatory step 201 stores tables A-E that contain rows that contain distinct vertices of the graph. Graph loading steps 202-207 intelligently distribute or replicate portions of the graph that contain equal amounts of vertices to each of computers 131-132. A cause of some or all of graph loading steps 202-207 depends on various implementations discussed later herein.

2.1 Distribution Versus Replication

Herein, distribution entails loading disjoint (i.e. nonintersecting) subsets having an equal count of distinct vertices on all computers 131-132, which means that a vertex is loaded on only one of computers 131-132. Vertex access is nonuniform such that access and analysis of a vertex that is distributed only to computer 131 is accelerated if locally performed by computer 131 instead of remotely by computer 132.

Herein, replication entails loading a same vertex on all computers 131-132. Access and analysis of a replicated vertex is uniform and always local and accelerated, regardless of being performed by any of computers 131-132.

There is a design tension between distribution and replication. For analytic speed, replication is better than distribution. For space, distribution is better than replication. An optimal balance entails distribution of most vertices, which consumes most of the storage capacity of computers 131-132, and replication of as many intelligently selected vertices as capacity permits as discussed later herein.

In a static embodiment, some or all of graph loading may eagerly occur any time after step 201 such as while a DBMS that hosts relational database 110 is starting. For example, distribution and replication of vertices of the graph may occur once and might not later be adjusted.

In a dynamic embodiment, some or all of graph loading is deferred until distributed system 100 receives or generates a request to analyze the graph such as a graph query. For example, distribution and replication of vertices of the graph may occur upon receipt and inspection of the request and might not later be adjusted. In a hybrid embodiment, eager graph loading occurs before receipt of the request, and replication is adjusted upon receipt of the request.

Herein, adjusting replication entails: a) initially replicating only high-degree tables and reserving some storage capacity of computers 131-132 as unused until later, and b) deferring replication of low-degree tables (e.g. connected tables presented later herein) until later time(s) such as opportunistically according to a condition or duration. Herein, adjusting replication monotonically increases which vertices are replicated. In other words, a vertex may eventually be promoted from distributed to replicated but never demoted back to distributed. Once storage capacity of computers 131-132 is exhausted as discussed later herein, there can be no further adjustment to replication.

In an autonomous embodiment, some or all of graph loading is deferred until distributed system 100 has gathered table access statistics of an ongoing analytic workload for the graph with concurrent or sequential analysis requests such as graph queries. For example, replication of vertices of the graph and repeated subsequent adjustment may occur at any time after step 201 based on table access statistics. Workload-based replication is discussed later herein.

2.2 Coordinated Replication

Step 202 treats edges as undirected and identifies high-degree vertices that each is connected to more edges in the graph than a predefined degree threshold. In step 202, computers 131-132 may load equal counts of distinct vertices from each of respective tables A-E. For example when computers 131-132 are only two computers, each of tables A-E may have its vertices logically divided into two halves, and each of computers 131-132 may load a separate half into local volatile or nonvolatile storage. In an embodiment, a central computer instructs computers 131-132 which respective half to load such as by specifying a subrange of vertex offsets within a table to load. The central computer is or is not one of computers 131-132.

In step 202, each of computers 131-132 may load and/or count edges that are connected to locally loaded vertices. In an embodiment, step 202 counts edges connected to local vertices without loading the edges. For example "SELECT COUNT(*) FROM D WHERE foreign_key_122 IN (locally loaded primary_key_123) GROUP BY foreign_key_122" may count edges that connect locally loaded vertices of table C to any vertices of table D.

Local tallies may occur for edges between tables A and C, edges between tables B and C, and edges between tables C and D. The local sum of those local tallies calculates the degree (i.e. edge count) of each local vertex in high-degree table C. For example, the degree of vertex C1 in high-degree table C is three. If the degree threshold to be exceeded is two, then vertex C1 has high degree and is a high-degree vertex. However if the degree threshold were instead three that the degree of vertex C1 equals but does not exceed, then C1 would instead be low degree.

The cardinality (i.e. row count) of a table is orthogonal to whether the table is high-degree or low-degree. A high-degree table may have more or fewer rows than a low-degree table. Magnitude of a positive count of other tables related to a table by foreign/primary key correspondence as statically indicated by a schema of relational database 110 may be more or less orthogonal to whether the table is high-degree or low-degree. A high-degree table may be related to more or fewer other tables than a low-degree table. Only a low-degree table can be schematically unrelated to all other tables.

In step 202, computers 131-132 detect which tables are locally high-degree tables because they contain only high-degree local vertices. Computers 131-132 each send to the central computer some or all local information such as: identifiers of locally high-degree tables, identifiers or copies of high-degree local vertices, and degrees of high-degree local vertices.

In step 203, the central computer detects that all vertices in a table are high-degree vertices, in which case the table actually is high degree. For example, step 203 may detect that computers 131-132 disagree that low-degree table E is locally high degree, in which case step 203 decides that low-degree table E actually is low degree instead of high degree.

Within capacity limits discussed elsewhere herein, all vertices of all high-degree tables should be replicated to all computers 131-132. With opportunistic exceptions discussed elsewhere herein, all vertices of low-degree tables should be locally loaded by only a respective one of computers 131-132.

Replication of high-degree tables is referred to herein as degree-based replication. Other replication strategies herein include schema-based replication, content-based replication, and workload-based replication. Only when degree-based replication does not exhaust capacity limits, some or all of these other replication strategies may occur at a same or different times.

2.3 Schema Based Replication

Steps 204-207 cooperate to provide schema-based replication. In step 204, the central computer inspects the schema of relational database 110 to infer that all vertices in low-degree table B can be connected by edges only to vertices in high-degree table C. For example, a foreign key may occur in table B or C that corresponds to a primary key in the other of table B or C, and there is no foreign key that occurs between low-degree table B and any table other than tables B-C.

Depending on the embodiment, step 204 may detect all low-degree tables that are: a) schematically related to only one other table, and that other table is high degree or b) schematically related to only one or more other tables, and those other table(s) all are high degree. These tables are referred to herein as connected tables, which are low-degree tables related only to high-degree tables. Step 204 treats edges as undirected.

In an embodiment, the criteria for being a connected table are relaxed to also include a linear chain that consists of two related low-degree tables. A first table in the chain is related to: a) a high-degree table and b) a second table in the chain that is related only to the first table. For example, the second table may be low-degree table E.

As explained earlier herein, replication may be capacity constrained, and high-degree tables have priority for replication instead of connected tables. If capacity is sufficient to replicate all high-degree tables and all connected tables, then steps 204-207 may replicate indirectly connected tables, which are: a) low-degree tables that are not connected tables and b) connected only to: c) one table, which is a connected table or d) one or more tables, which all are connected tables. Depending on the embodiment, either (c) or (d) is implemented.

In step 205, the central computer sends (e.g. broadcasts) identifiers of connected tables to all computers 131-132. Each of computers 131-132 may calculate the degree of each local vertex of the connected tables. In step 206, computers 131-132 each send to the central computer some or all local information such as: identifiers or copies of connected local vertices and degrees of connected local vertices.

In step 207, the central computer replicates, within capacity limits discussed elsewhere herein, all vertices of all connected tables and all vertices of all high-degree tables to all computers 131-132. Replication may entail sending (e.g. broadcasting) to all of computers 131-132 identifiers or copies of vertices to be locally loaded into volatile or nonvolatile storage on all computers 131-132. A computer need not load a vertex that is already locally loaded.

2.4 Benchmark Example

After step 207, distributed system 100 may execute a request to analyze the graph. This may entail some or all of: a) broadcasting the request to some or all of computers 131-132 for execution upon respective local portions of the graph, b) generating a respective distinct local request for some or all of computers 131-132 and sending the local requests to respective computers for execution upon respective local portions of the graph, c) some or all of computers 131-132 communicating with each other such as to send or receive non-local vertices or edges or intermediate results, and d) the central computer receiving respective local results from some or all computers 131-132 and combining or further processing those local results to generate a final result that answers the graph analysis request.

The following example property graph query language (PGQL) statement is a Transaction Processing Performance Council hourly (TPC-H) benchmark query that calculates revenue for each nation in 'ASIA' between '1994-01-01' and '1995-01-01'. After step 207, execution of this example query is accelerated due to intelligent replication of vertices. The TPC-H schema for this example query is defined in FIG. 2 of version 3.0.0 of the "TPC Benchmark H Standard Specification" published Feb. 18, 2021 by the TPC, which is incorporated in its entirety herein.

```
SELECT
n.N_NAME,
SUM(l.L_EXTENDEDPRICE * (1 - l.L_DISCOUNT)) AS REVENUE
MATCH
(l :LINEITEM) - [:LINEITEM_ORDERS] ->(o :ORDERS),
(l) - [:LINEITEM_SUPPLIER] ->(s :SUPPLIER),
(o) - [:ORDER_CUSTOMER] ->(c :CUSTOMER),
(s) - [:SUPPLIER_NATION] ->(n),
(c) - [:CUSTOMER_NATION] ->(n :NATION),
(n) - [:NATION_REGION] ->(r :REGION) WHERE
r.R_NAME = 'ASIA'
AND o.O_ORDERDATE >= DATE '1994-01-01'
AND o.O_ORDERDATE < DATE '1995-01-01'
GROUP BY n.N_NAME
ORDER BY REVENUE DESC
```

Use of the NATION and REGION tables in the TPC-H schema are accelerated by techniques herein. The NATION table contains 25 rows/vertices. In the TPC-H dataset, the NATION table is high degree and should be replicated across all computers 131-132. In one example, the REGION table is low degree. The REGION table contains only five rows and is connected only to the NATION table.

In the state of the art, many of the TPC-H benchmark queries have a network bottleneck/imbalance problem due to not replicating REGION vertices. Most of the queries access a REGION vertex from a NATION vertex, and REGION vertices are accessed as frequently as NATION vertices. Because REGION vertices are not replicated in the state of the art, accessing a REGION vertex entails non-local (i.e. communication network) access. Even if there are a hundred participating computers, REGION vertices are locally stored on only five computers because the state of the art does not replicate REGION vertices. Unlike the state of the art that causes a bottleneck with those five computers, techniques herein replicate the REGION table to all hundred computers as a connected table as defined earlier herein.

3.0 Capacity Constrained Replication Process

Figure 3:
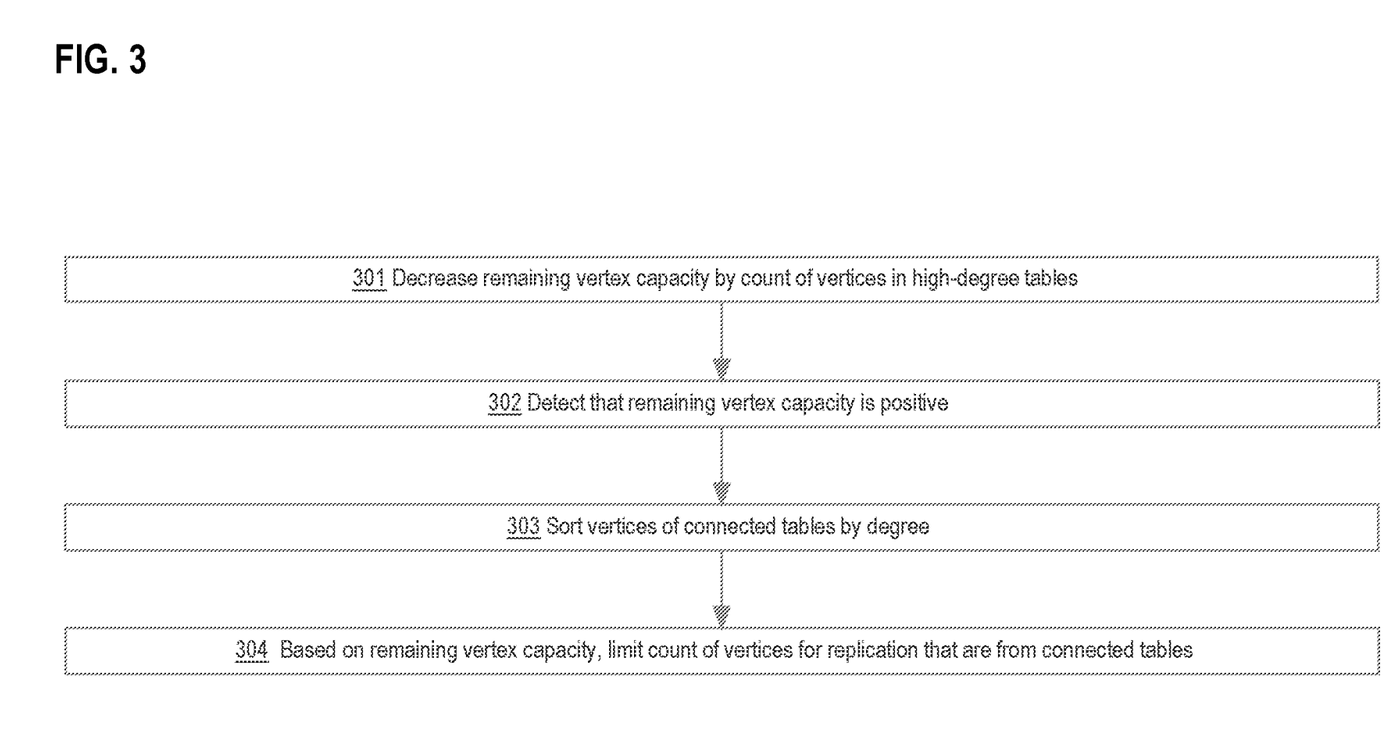
FIG. 3 is a flow diagram that depicts an example computer process that a distributed system may perform for replication when participating computers have limited storage capacity.

FIG. 3 is a flow diagram that depicts an example computer process that distributed system 100 may perform for replication when computers 131-132 have limited storage capacity, in an embodiment. The steps of the processes of FIGS. 2-3 may be complementary and interleaved. FIG. 3 is discussed with reference to FIG. 1.

Computers 131-132 may have same or different capacities to locally store an amount of vertices. The central computer may initialize a remaining vertex capacity to be the least of the vertex storage capacities of computers 131-132. As explained earlier herein, a first phase locally loads equal counts of distinct vertices of all tables A-E into computers 131-132 such that every vertex in the graph is locally stored in exactly one respective computer.

In a second phase, the central computer decides which vertices should be opportunistically replicated to all computers 131-132. That overall decision may entail a sequence of decisions in steps 301-304 to replicate additional vertices to all computers 131-132. The sequence of decisions occur in a prioritized ordering that can be prematurely terminated when the remaining vertex capacity discussed above is exhausted. Only when the sequence of decisions ceases are any vertices replicated to all computers 131-132.

Step 301 decreases the remaining vertex capacity by a count of vertices in high-degree tables. At most the initial remaining vertex capacity of vertices in high-degree tables should be replicated to all computers 131-132.

Step 301 ignores which high-degree table did a vertex come from. For example if step 301 exhausts the remaining vertex capacity, then it is possible that: a) all high-degree tables might have some vertices that are replicated and/or all high-degree tables might have some vertices that are not replicated, or b) some high-degree tables might have no vertices replicated even though other high-degree tables have all vertices replicated. Step 301 ignores high-degree vertices in low-degree tables. For example, step 301 may decide to replicate a vertex in a high-degree table even though: a) the degree of that vertex is less than that of a high-degree other vertex in a low-degree table, and b) the other vertex will or will not be replicated.

Step 302 detects whether the remaining vertex capacity is positive, which means that all vertices in all high-degree tables should be replicated to all computers 131-132. If instead there are too many vertices in high-degree tables because the remaining vertex capacity is exhausted, then the central computer sorts all vertices in all high-degree tables by degree and will replicate to all computers 131-132 only as many of those vertices of the highest sorted degrees as the initial remaining vertex capacity allows.

If step 302 detects that step 301 exhausted the remaining vertex capacity, then the process of FIG. 3 ceases and the subset of the sorted vertices of high-degree tables are replicated to all computers 131-132. Otherwise, the remaining vertex capacity is positive, and steps 303-304 process connected tables in way that is somewhat similar to processing high-degree tables in steps 301-302. As discussed earlier herein, connected tables are connected only to high-degree tables.

Step 303 detects whether the remaining vertex capacity is sufficient for all vertices in all connected tables, which means that all vertices in all connected tables should be replicated to all computers 131-132. If instead there are too many vertices in connected tables, then the central computer sorts all vertices in all connected tables by degree and will replicate to all computers 131-132 only as many of those vertices of the highest sorted degrees as the remaining vertex capacity allows.

Step 303 ignores which connected table did a vertex come from and ignores whether the vertex itself is high degree or low degree. For example if step 303 exhausts the remaining vertex capacity, then it is possible that: a) all connected tables might have some vertices that are replicated and/or all connected tables might have some vertices that are not replicated, or b) some connected tables might have no vertices replicated even though other connected tables have all vertices replicated.

Based on the remaining vertex capacity, step 304 limits a count of vertices for replication that are from all connected tables. After step 304, replication (e.g. broadcast of identifiers or copies of vertices) to all computers occurs for all vertices that were selected for replication. This entails replicating all vertices from high-degree tables and selected sorted or all vertices from all connected tables.

4.0 Content Based Replication Process

Figure 4:
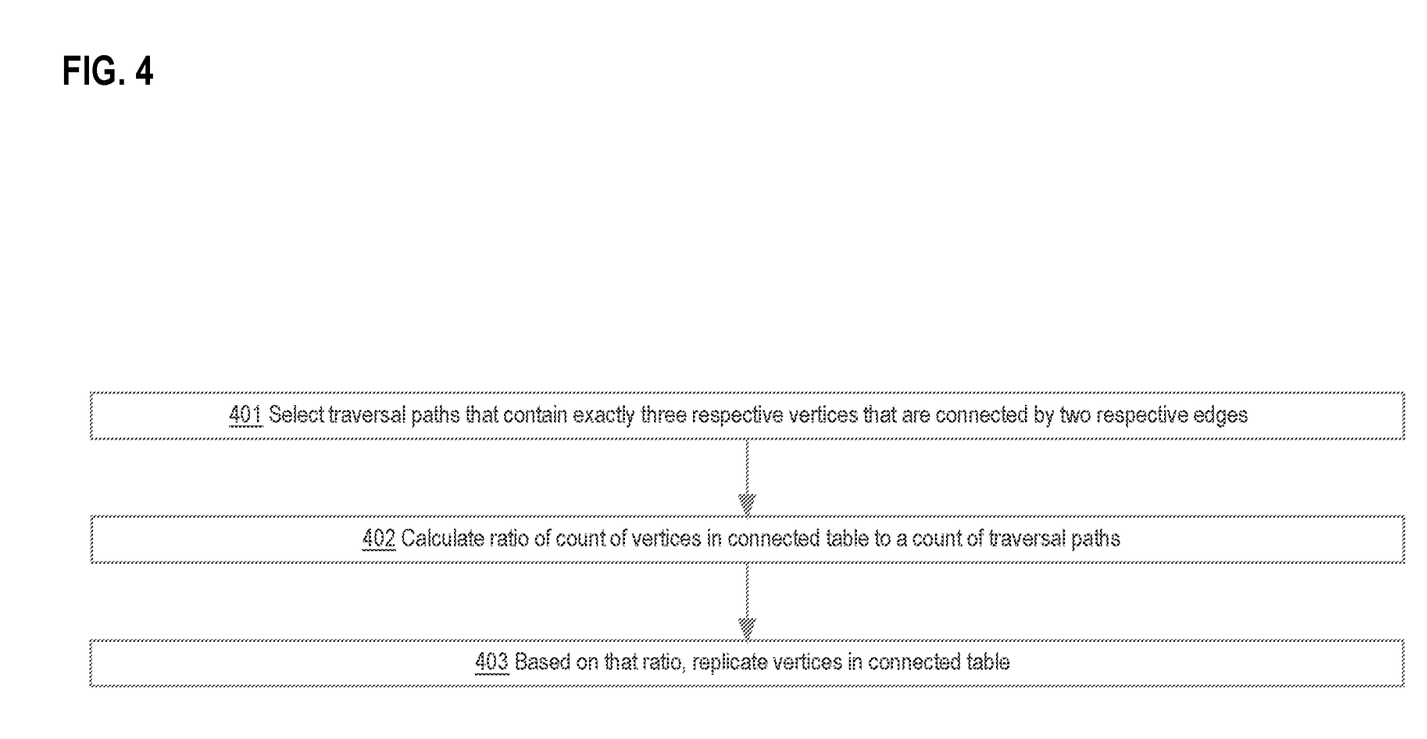
FIG. 4 is a flow diagram that depicts an example computer process that a distributed system may perform for replication based on traversal paths.

FIG. 4 is a flow diagram that depicts an example computer process that distributed system 100 may perform for replication based on traversal paths, in an embodiment. The steps of some or all of the processes of FIGS. 2-4 may be complementary and interleaved. FIG. 4 is discussed with reference to FIG. 1.

The process of FIG. 4 provides content-based replication of a low-degree table in a way that combines aspects of degree-based replication and schema-based replication. Step 401 treats edges as undirected and selects traversal paths that contain exactly three respective vertices that are connected by two respective edges. Each traversal path has a middle vertex that is neither end of the traversal path.

The middle vertex is in a connected table that is related to a high-degree table. The other two vertices in the traversal path are a vertex in that high-degree table and a vertex in any other table that is related to the high-degree table. For example for such traversal paths in FIG. 1, low-degree table B may be the connected table in the traversal paths. At the opposite end of some of those traversal paths may be low-degree table D, and at the opposite end of some others of those traversal paths may be table A, regardless of whether table A is high degree or low degree.

Step 401 may be repeated for each connected table. For example if table A is itself a connected table at one end of the traversal paths, then low-degree tables B and D are at the opposite end of the traversal paths.

Step 402 calculates a ratio of a count of vertices in the connected table to a count of traversal paths that start at the connected table. A lower ratio means that the connected table is small but likely to be frequently accessed. If the ratio exceeds a ratio threshold, then the connected table should not be replicated.

This content-based replication is a modification of schema-based replication that decreases replication by disqualifying some connected tables. Step 403 replicates connected tables that are not disqualified.

5.0 Workload Based Replication

Replication may be deferred and adjusted in various ways that may or may not entail autonomous decisions by distributed system 100. Some or all of the following mechanisms may be involved as discussed earlier herein, which may or may not be autonomously controlled:

reservation of some storage capacity of computers 131-132, prioritized replication strategies such that some strategies may be deferred, adjusting previous replication by monotonically increased replication, and workload-based replication.

An embodiment may monitor usage statistics such as a respective usage count of each table or each table not yet replicated. If the usage count of such an accessed table exceeds an access threshold and replication capacity is not exhausted, then distributed system 100 may autonomously decide to replicate the accessed table. The following are example usage counts.

a count of query executions that reference the accessed table, a count of operators that reference the accessed table in execution plans of multiple queries, and a count of table scans of the accessed table.

A query plan is a generated executable dataflow graph that usually is a tree whose nodes are operators that implement an operation of a query execution such as joining, filtering, scanning, and projecting. Herein, table access and table scanning does not mean actual access of database tables. Because all vertices from all tables were already loaded into computers 131-132, table access and table scanning instead means access or scanning of vertices that were already loaded from a table. In other words, query plans herein are for graph queries, not database queries, and usage statistics are graph statistics collected by distributed system 100, not by a DBMS itself. In an embodiment, distributed system 100 tracks which vertices were loaded from which database tables.

6.0 Database System Overview

A database management system (DBMS) manages one or more databases. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement that conforms to a database language. A database language for expressing the database commands is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/XML is a common extension of SQL used when manipulating XML data in an object-relational database.

A multi-node database management system is made up of interconnected nodes that share access to the same database or databases. Typically, the nodes are interconnected via a network and share access, in varying degrees, to shared storage, e.g. shared access to a set of disk drives and data blocks stored thereon. The varying degrees of shared access between the nodes may include shared nothing, shared everything, exclusive access to database partitions by node, or some combination thereof. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
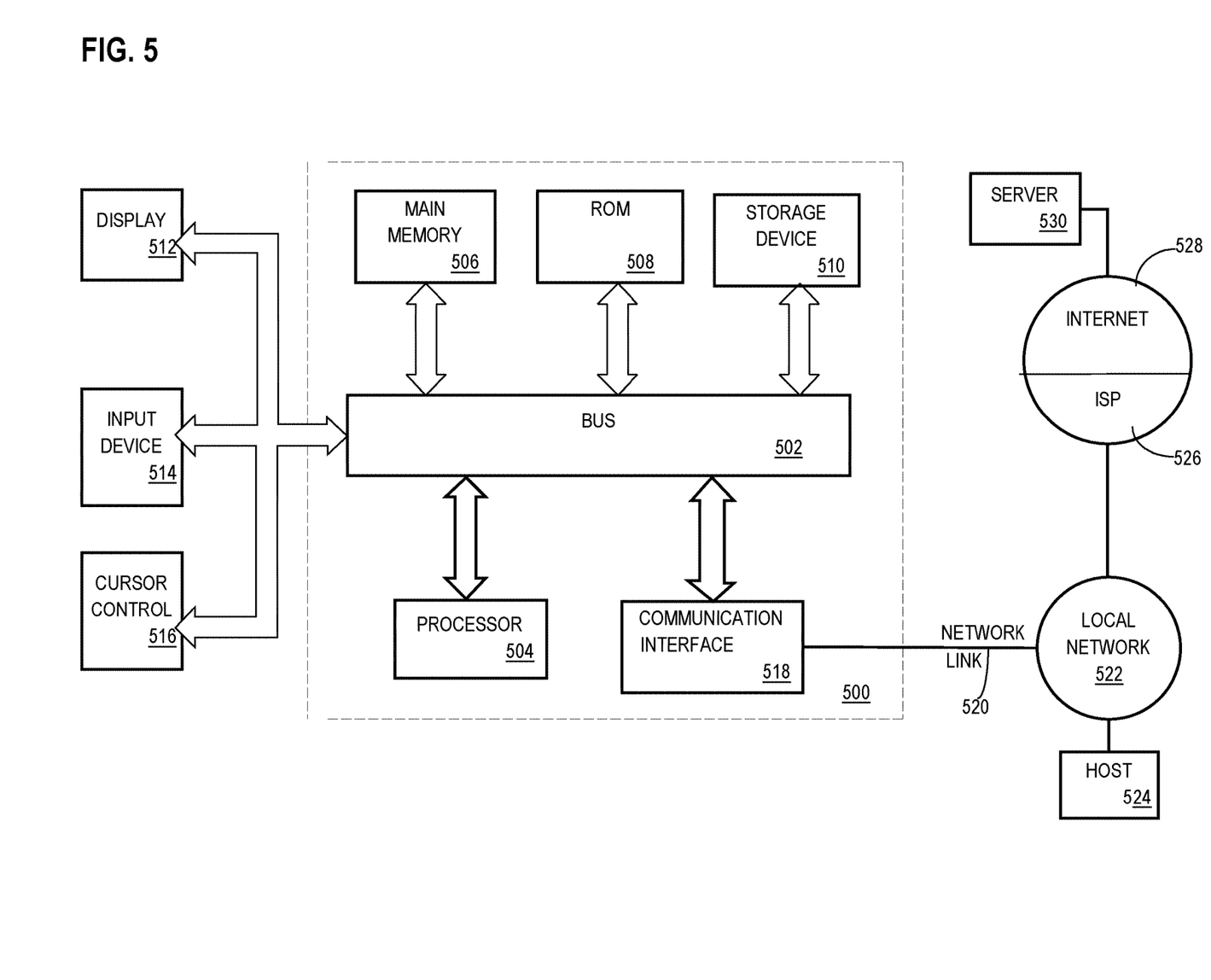
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Software Overview

Figure 6:
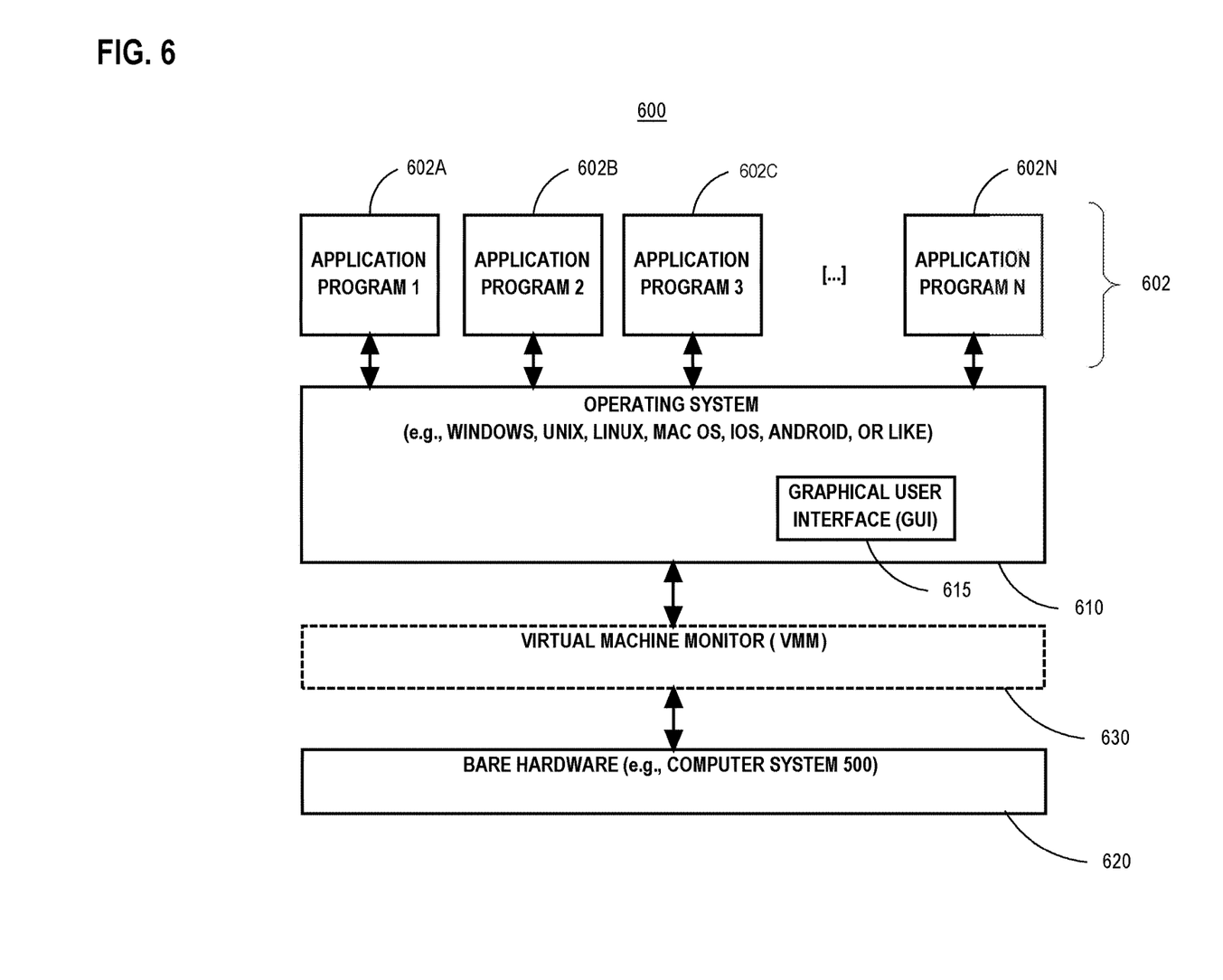
FIG. 6 is a block diagram that illustrates a basic software system that may be employed for controlling the operation of a computing system.

FIG. 6 is a block diagram of a basic software system 600 that may be employed for controlling the operation of computing system 500. Software system 600 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 600 is provided for directing the operation of computing system 500. Software system 600, which may be stored in system memory (RAM) 506 and on fixed storage (e.g., hard disk or flash memory) 510, includes a kernel or operating system (OS) 610.

The OS 610 manages low-level aspects of computer operation, including managing execution of processes, memory allocation, file input and output (I/O), and device I/O. One or more application programs, represented as 602A, 602B, 602C . . . 602N, may be "loaded" (e.g., transferred from fixed storage 510 into memory 506) for execution by the system 600. The applications or other software intended for use on computer system 500 may also be stored as a set of downloadable computer-executable instructions, for example, for downloading and installation from an Internet location (e.g., a Web server, an app store, or other online service).

Software system 600 includes a graphical user interface (GUI) 615, for receiving user commands and data in a graphical (e.g., "point-and-click" or "touch gesture") fashion. These inputs, in turn, may be acted upon by the system 600 in accordance with instructions from operating system 610 and/or application(s) 602. The GUI 615 also serves to display the results of operation from the OS 610 and application(s) 602, whereupon the user may supply additional inputs or terminate the session (e.g., log off).

OS 610 can execute directly on the bare hardware 620 (e.g., processor(s) 504) of computer system 500. Alternatively, a hypervisor or virtual machine monitor (VMM) 630 may be interposed between the bare hardware 620 and the OS 610. In this configuration, VMM 630 acts as a software "cushion" or virtualization layer between the OS 610 and the bare hardware 620 of the computer system 500.

VMM 630 instantiates and runs one or more virtual machine instances ("guest machines"). Each guest machine comprises a "guest" operating system, such as OS 610, and one or more applications, such as application(s) 602, designed to execute on the guest operating system. The VMM 630 presents the guest operating systems with a virtual operating platform and manages the execution of the guest operating systems.

In some instances, the VMM 630 may allow a guest operating system to run as if it is running on the bare hardware 620 of computer system 600 directly. In these instances, the same version of the guest operating system configured to execute on the bare hardware 620 directly may also execute on VMM 630 without modification or reconfiguration. In other words, VMM 630 may provide full hardware and CPU virtualization to a guest operating system in some instances.

In other instances, a guest operating system may be specially designed or configured to execute on VMM 630 for efficiency. In these instances, the guest operating system is "aware" that it executes on a virtual machine monitor. In other words, VMM 630 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
storing, in a relational database, a plurality of tables, wherein:
each table of the plurality of tables contains a respective plurality of rows, and
each row of the plurality of rows of each table contains a vertex of a graph;
identifying a plurality of high-degree vertices, wherein:
each high-degree vertex in the plurality of high-degree vertices is connected to a respective plurality of edges in the graph, and
a count of the plurality of edges of each high-degree vertex exceeds a degree threshold;
detecting that all vertices in a high-degree subset of tables of the plurality of tables are high-degree vertices; and
replicating, based on said detecting all vertices in the high-degree subset of tables are high-degree vertices, a plurality of vertices of the graph that are not in the high-degree subset of tables to a plurality of computers.

2. The method of claim 1 wherein the plurality of vertices of the graph that are not in the high-degree subset of tables are in a connected subset of tables that are connected only to the high-degree subset of tables.

3. The method of claim 2 wherein said replicating the plurality of vertices of the graph that are in the connected subset of tables comprises sending, by each computer in the plurality of computers, for each vertex in the connected subset of tables:
an identifier of the vertex, and
a count of edges in the graph that are connected to the vertex.

4. The method of claim 3 wherein said sending, by each computer in the plurality of computers and for each vertex in the connected subset of tables, is in response to receiving, by each computer, a request that contains an identifier of each table in the connected subset of tables.

5. The method of claim 2 wherein said replicating the plurality of vertices of the graph that are in the connected subset of tables comprises inferring, from a schema of the relational database, that all vertices in a particular table that is not in the high-degree subset of tables can be connected by edges in the graph only to vertices in one selected from a group consisting of:
one table of the high-degree subset of tables, and
one or more tables of the high-degree subset of tables.

6. The method of claim 5 further comprising:
inferring, from the schema of the relational database, that all vertices in a second table that is not in the high-degree subset of tables can be connected by edges in the graph only to vertices in the particular table;
including the second table in the connected subset of tables.

7. The method of claim 2 further comprising:
selecting a plurality of traversal paths that contain exactly three respective vertices in the graph that are connected by two respective edges in the graph, wherein for each traversal path in the plurality of traversal paths:
the three respective vertices contains a respective first vertex in a first table that is in the connected subset of tables and a respective second vertex in a second table of the high-degree subset of tables, and
the respective second vertex is connected to the two respective edges;

calculating a ratio of a count of vertices in the first table to a count of traversal paths in the plurality of traversal paths, wherein said replicating the plurality of vertices of the graph that are in the connected subset of tables is based on said calculating the ratio of the count of vertices to the count of traversal paths.

8. The method of claim 2 further comprising based on executions of a plurality of queries, for each accessed table of the plurality of tables, detecting a respective usage count selected from a group consisting of:
a count of said executions that reference the accessed table,
a count of operators that reference the accessed table in execution plans of the plurality of queries, and
a count of table scans of the accessed table.

9. The method of claim 1 further comprising decreasing a remaining vertex capacity by a count of the plurality of high-degree vertices in the graph.

10. The method of claim 9 wherein said replicating the plurality of vertices of the graph that are not in the high-degree subset of tables comprises limiting, based on the remaining vertex capacity, a count of vertices to be replicated that are not in the high-degree subset of tables.

11. The method of claim 10 wherein said limiting the count of vertices to be replicated that are not in the high-degree subset of tables comprises sorting, by degree, multiple vertices in multiple tables that are not in the high-degree subset of tables.

12. The method of claim 10 further comprising detecting, before said limiting the count of vertices to be replicated that are not in the high-degree subset of tables, that the remaining vertex capacity is positive.

13. The method of claim 1 wherein said detecting all vertices in the high-degree subset of tables are high-degree vertices comprises:
distributing a respective subset of all vertices in a particular table to each computer in the plurality of computers;
detecting, by each computer in the plurality of computers, that the respective subset of said all vertices in the particular table contains only high-degree vertices.

14. The method of claim 13 wherein said detecting that all vertices in the particular table are high-degree vertices comprises sending, to a central computer by each computer in the plurality of computers, an indication that the respective subset of said all vertices in the particular table contains only high-degree vertices.

15. The method of claim 14 wherein the indication for the particular table contains an identifier of the particular table.

16. One or more non-transitory computer-readable media storing instructions that, when executed by one or more processors, cause:
storing, in a relational database, a plurality of tables, wherein:
each table of the plurality of tables contains a respective plurality of rows, and
each row of the plurality of rows of each table contains a vertex of a graph;
identifying a plurality of high-degree vertices, wherein:
each high-degree vertex in the plurality of high-degree vertices is connected to a respective plurality of edges in the graph, and
a count of the plurality of edges of each high-degree vertex exceeds a degree threshold;
detecting that all vertices in a high-degree subset of tables of the plurality of tables are high-degree vertices; and replicating, based on said detecting all vertices in the high-degree subset of tables are high-degree vertices, a plurality of vertices of the graph that are not in the high-degree subset of tables to a plurality of computers.

17. The one or more non-transitory computer-readable media of claim 16 wherein the plurality of vertices of the graph that are not in the high-degree subset of tables are in a connected subset of tables that are connected only to the high-degree subset of tables.

18. The one or more non-transitory computer-readable media of claim 16 wherein the instructions further cause decreasing a remaining vertex capacity by a count of the plurality of high-degree vertices in the graph.

19. The one or more non-transitory computer-readable media of claim 18 wherein said replicating the plurality of vertices of the graph that are not in the high-degree subset of tables comprises limiting, based on the remaining vertex capacity, a count of vertices to be replicated that are not in the high-degree subset of tables.

20. The one or more non-transitory computer-readable media of claim 16 wherein said detecting all vertices in the high-degree subset of tables are high-degree vertices comprises:
- distributing a respective subset of all vertices in a particular table to each computer in the plurality of computers;
- detecting, by each computer in the plurality of computers, that the respective subset of said all vertices in the particular table contains only high-degree vertices.

\* \* \* \* \*